UNITED STATES PATENT OFFICE.

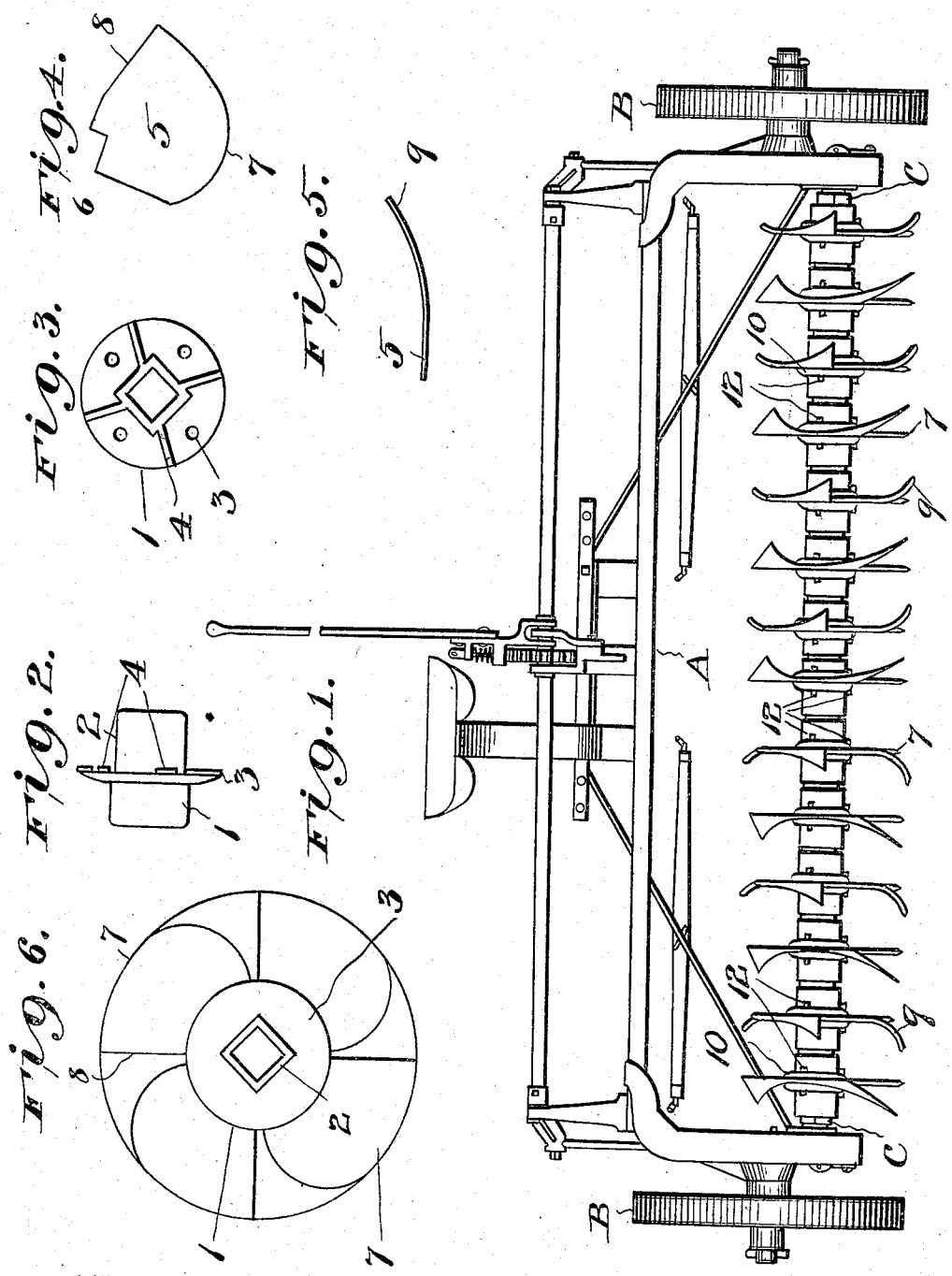

ALFRED E. FOX AND GEORGE M. REEVES, OF REDKEY, INDIANA, ASSIGNORS OF ONE-FOURTH TO WILLIAM WILLIAMS AND TO BENJAMIN W. WHITEHAIR, OF REDKEY, INDIANA.

DISK FOR DISK HARROWS.

No. 930,951.      Specification of Letters Patent.      Patented Aug. 10, 1909.

Original application filed September 29, 1908, Serial No. 455,271. Divided and this application filed December 29, 1908. Serial No. 469,788.

*To all whom it may concern:*

Be it known that we, ALFRED E. Fox and GEORGE M. REEVES, citizens of the United States, and residents of Redkey, in the county of Jay and State of Indiana, have invented certain new and useful Improvements in Disks for Disk Harrows, of which the following is a specification.

The matter hereinafter described was formerly included in a certain application for patent on improvements in disk harrows, filed September 29, 1908, and given Serial No. 455,271, and this application is a divisional application thereof.

The invention relates to disks used in disk-harrows, and has for its object the provision of an improved construction of disks made up of a series of detachable blades, each having a sharpened curved edge eccentric to the periphery of the disk, the rear edges of the blades being on substantially radial lines to the disk, and the points formed by the curved and straight edges bent to one side to form flukes that turn the soil when leaving the ground.

The construction of our improved disk will be described in detail hereinafter and illustrated in the accompanying drawings, in which—

Figure 1 is a rear view of a wheel harrow showing our improved disks installed thereon; Figs. 2 and 3, side and end views of one of the disk-hubs; Figs. 4 and 5, side and edge views of one of the disk-blades; and Fig. 6, a side view of one of the disks and hubs assembled.

In the drawings similar reference characters indicate corresponding parts throughout the several views.

A indicates a harrow-frame mounted on wheels B and having a rectangular shaft C, on which is mounted our improved disks.

The disks consist of a hub 1, having a rectangular base 2 to fit shaft C, and each hub is provided with a flange 3, having a radial projection 4 extending from each side of the hub adjacent to one edge to the outer edge of the flange to form sockets to receive the blades 5, that are provided with rectangular notches 6 to engage the surface of the hub inclosed between each pair of projections.

Each blade 5 has an edge 7 that begins at the periphery of flange 3 and curves outwardly and to the rear, while its rear edge 8 is substantially parallel to the radial line of the hub. The curved edge 7 is formed with a cutting edge and the rear portion of each blade is bent laterally, as shown at 9, said bent portions extending toward the sides of the machine at each side of its middle, as clearly shown in Fig. 1.

It will be apparent that when the disks engage the soil the cutting edges 7 cut the clods while the bent portions 9 act as rollers to mash and pulverize them, and when lifted from the soil at the rear of the disk said bent portions turn the soil engaged thereby and leave it light and loamy.

If desired, the hubs and blades may be so constructed that the middle of the blades on the alternate hubs are opposite the points on the adjacent disks, as shown in Fig. 1, but this is not essential to a complete and satisfactory operation of our machine, so that it is thought to be unnecessary to describe them, such changes being within the province of a skilled mechanic.

10 indicates a clamping disk having a circular opening 11, and mounted on the hub to secure the blades in position, said disk and blades being held in position by means of bolts 12, secured through holes in flange 3, blades 5, and clamping-disk 10.

Having thus described our invention, what we claim is—

1. A harrow-disk comprising a hub, said hub having a rectangular base, a flange projecting from said base, and radial projections extending obliquely from the sides of said base to the outer edge of the flange, and blades secured to said hub having a curved and sharpened front edge, the rear edge straight and substantially parallel to the radius of the hub, the point formed by said edges bent laterally, the inner edges of said blades formed with rectangular notches to engage the corners of the hub-base between the projections, substantially as shown and described.

2. A harrow-disk comprising a hub, said hub having a rectangular base a flange extending from said base, and projections extending from each side of the base, obliquely to said side and radially of the flange forming sockets with rectangular offsets, blades mounted in said sockets having rectangular notches in their edges to fit the corners of the base, and a clamping washer secured through said flange and blades, substantially as shown and described.

3. A harrow-disk comprising a hub, said hub having a rectangular base a flange extending from said base, and projections extending from each side of the base, obliquely to said side and radially of the flange forming sockets with rectangular offsets, blades mounted in said sockets having rectangular notches to engage the corners of the base, said blades having curved and sharpened front edges, the rear edges straight and substantially parallel to the radius of the hub, and the point formed by said edges bent laterally, and a clamping washer secured through said flange and blades, substantially as shown and described.

In witness whereof, we have hereunto set our hands in presence of two subscribing witnesses.

ALFRED E. FOX.
GEORGE M. REEVES.

Witnesses:
H. M. SARTELLE,
DAVID NICKLIN.